Nov. 13, 1934.     H. NIEDERREITHER     1,980,873
ELECTROLYZER AND ELECTRIC ACCUMULATOR
Filed March 24, 1933
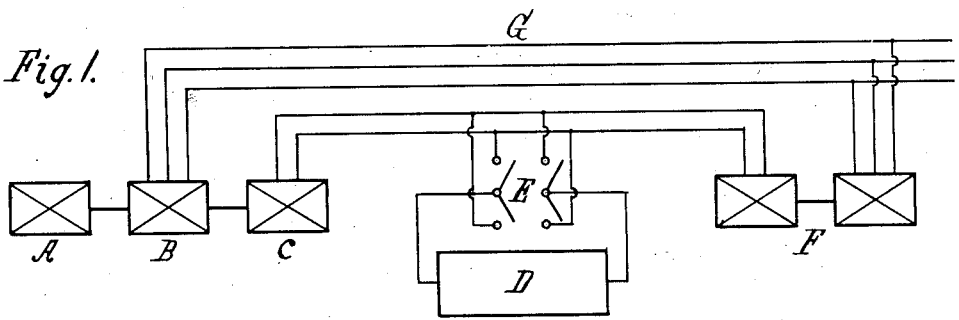
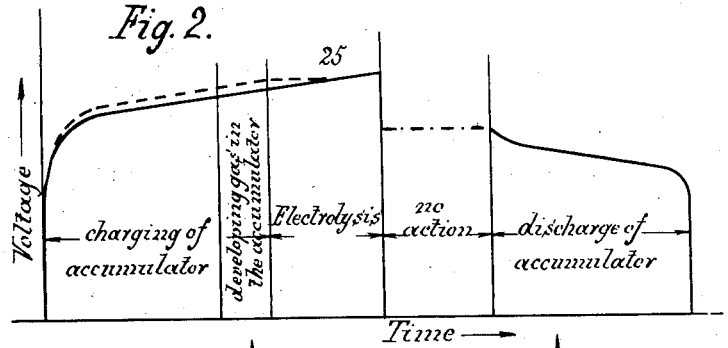
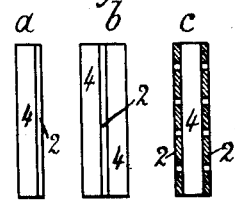
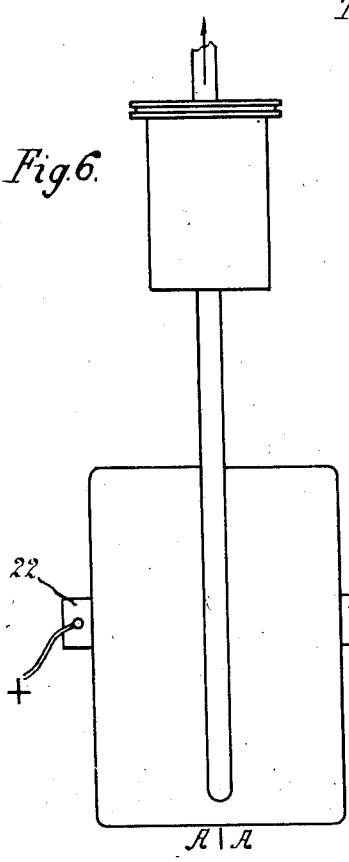
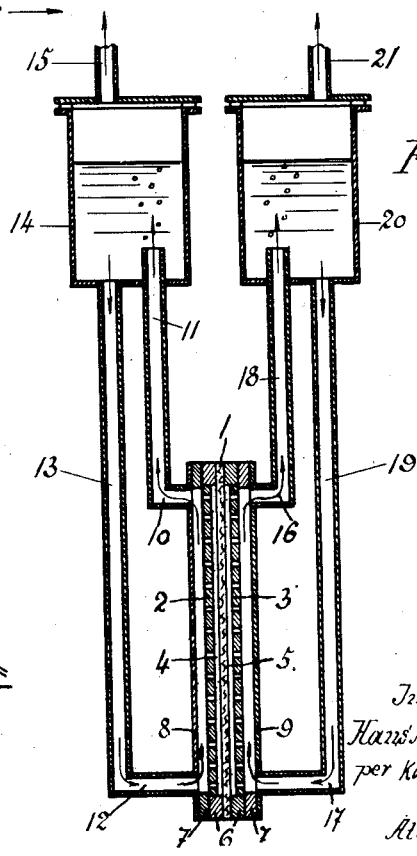
Inventor:
Hans Niederreither.
per Karl H. Mayr.
Attorney.

Patented Nov. 13, 1934

1,980,873

UNITED STATES PATENT OFFICE 1,980,873

ELECTROLYZER AND ELECTRIC ACCUMULATOR

Hans Niederreither, Munich, Germany

Application March 24, 1933, Serial No. 662,552
In Germany March 23, 1932

4 Claims. (Cl. 204—5)

This invention relates to a process and apparatus for the electrolytic treatment of liquids and fusible matters and more particularly to a method and apparatus for the electric production of liquid and gaseous matters, e. g. hydrogen, which may be used for the generation of heat or which may be transformed together with other matters into other chemical products.

An object of my invention resides in the provision of a new process for the electrolytic treatment of liquids and fusible matters which secures very high economy, particularly low consumption of electric energy.

An object of the present invention resides in the provision of a method for the purpose specified which requires apparatus and equipment of very low initial cost.

An object of the present invention resides in the provision of a method for the electrolytic treatment of liquids and fusible matters which is particularly adapted to use surplus electric energy, especially if such energy is at times available in large amounts.

An object of my invention resides in the provision of a method and an apparatus which can be used for the electrolytic production of liquid or gaseous matters and, at the same time, for the accumulation of electric energy.

Further and other objects of the present invention will be hereinafter set forth in the accompanying specification and claims and shown in the drawing which, by way of illustration, shows what I now consider to be a preferred embodiment of the invention.

In the drawing:

Fig. 1 is a schematic diagram showing the general arrangement and wiring of my apparatus within a power system.

Fig. 2 is a diagram showing the electric voltage during the charging, electrolyzing and discharging period.

Figs. 3a, 3b, 3c and Fig. 4 show various alternatives for the construction of the electrodes.

Fig. 5 is a cross section through a diagrammatic drawing of the combined electric accumulator and electrolytic decomposing apparatus.

Fig. 6 is a front view of a diagrammatic showing of the apparatus.

It is common practice to accumulate electric energy, particularly surplus energy, as e. g. such available from water power plants during the night, by the electrochemical transformation of electrodes, e. g. in lead accumulators, so-called Edison accumulators, or the like. The process and apparatus designated by the term "Edison accumulator" will be described later. Equipment of this type is very expensive and can not be employed to such an extent as would be desirable in today's power systems where, at certain times, large amounts of surplus energy are available and, at other times, large amounts of power—peak loads—are demanded. The efficiency of such accumulating methods is low partly because, when fully charging, the accumulator, a considerable percentage of the energy is used up for the generation of gas which escapes into the atmosphere. This is the case with lead accumulators as well as with the so called Edison accumulator both types generating hydrogen and oxygen.

In an apparatus according to my invention, accumulation of electric energy and the useful electrolytic decomposing process are combined in one and the same equipment. Electrolyzer and electric accumulator are in a common chamber. By choosing suitable material for the electrodes and the active electrode matter, the apparatus may be operated with a common electrolyte and with one and the same electrodes and one and the same provision for the supply of electric current and the discharge of the apparatus when acting as accumulator.

Thus the initial cost is reduced because of the savings in material, space, etc., and the efficiency of the storage process is increased as compared with that of an ordinary accumulator because the gases otherwise escaping when the accumulator is completely charged can be caught and used.

The schematic diagram Fig. 1 shows how my combined electrolyzing and electric accumulator apparatus may be arranged in a power system. A is the prime mover which may be a steam turbine or a water turbine. B is the electric AC generator, and C a DC generator, both driven by the prime mover. If the power consumption is low, the load on the generator B drops and the power available for and from the prime mover A may be used to generate DC current in the generator C. This DC current is used in the combined electrolyzing and accumulator apparatus D to which it is directed over the reversing switch E. It can be first used for charging up the accumulator and for the electrolyzing process. If more electric energy is demanded from the system than is available from the power engine A, the switch E is reversed and DC current taken from the apparatus D. If it can not be used as DC current, it may be transformed into AC current in the transformer F and thence fed back into the system G.

According to my invention, the charging voltage of the accumulator is maintained equal or, preferably, lower than the normal tension during the decomposing period of the electrolytic process, as is shown by the solid line on Fig. 2. Thereby the accumulator is first charged when the current is switched on and is ready for use at any time.

The charging voltage may as well be somewhat higher than the lowest voltage required for the electrolyzing process. This kind of operation is indicated by the dotted line on Fig. 2. In this latter case the accumulator is not charged before the voltage of the electrolytic decomposing process has grown so much with increasing load that the decomposing tension is equal to the charging tension. This is the case at point 25 of the voltage diagram Fig. 2. It is essential that the highest decomposing voltage be somewhat above the highest charging voltage to assure a complete charge of the accumulator. The advantage of the combination of the two methods, the electrolytic decomposition of liquid solutions and the accumulation of electric current, is particularly obvious when both methods are operated with surplus current. During a peak load period, the surplus energy which was previously accumulated in an apparatus according to my invention can be discharged to the electric system. The receipts for the thus provided peak load energy cover the first cost of the equipment to a large degree, if not fully. The cost of the electrolysis is therefore equal to the cost of the electric current, and the production of gas or other products of the electrolysis is particularly inexpensive if more surplus energy is available than must be accumulated to take care of the peak load periods. No special equipment or enlargement of the accumulator cells, etc. is necessary to employ this surplus energy as it is used for electrolyzing purposes in the same apparatus as is used for accumulating.

It is desirable that the electrodes consist partly of an electrochemically stable metal and partly of electrochemically unstable material. For this purpose the electrochemically unstable material 4 may be applied to one side (as in Fig. 3a) or to both sides (as in Fig. 3b) of the stable electrode 2. The electrochemically unstable matter may also be fixed in between two perforated electrode plates connected to the same electric pole and being of an electrochemically stable material (Fig. 3c). This may be done with one or both electrodes. Such an arrangement has the advantage that the active matter may work on both sides and in two directions.

Another method of performing my invention is to apply the electrochemically unstable matter wholly or partly into openings or pores of such parts of the electrodes as are electrochemically stable (Fig. 4).

Another way of performing my invention is to press, by means of perforated electrode plates, the electrochemically active substance on to the diaphragm which may consist of asbestos board or of several layers of asbestos paper, whereby the free sides of the electrode plates are in direct contact with the electrolytic fluid. This is shown on Fig. 5. The advantage of such an arrangement resides in the small internal resistance of the cell. The gas can escape freely from the back side of the electrodes. The pressure of the electrodes against the active substance assures sufficient mechanical strength for this arrangement.

In each of the foregoing applications or embodiments of my invention it is advisable to use steel for the cathode as the stable electrode metal and nickel for the anode and kaliumhydroxide as electrolyte. The steel cathodes may be covered with a layer of pulverized equally distributed iron or with ironhydroxide mixed with mercury, and the nickel anode with a layer of nickelhydroxide or with pulverized nickelhydroxide mixed with evenly distributed nickel or graphite.

Such active substances may also be pressed, e. g. in plate form; in any case they must be electrically well contacting with the metallic parts of the electrodes. My invention is by no means limited to the use of the before described composition of the substances for the electrolyte and electrodes which is used in the so called Edison accumulator; the invention may also be carried out with various other compositions, e. g. the compositions as used in the lead accumulator.

The other parts of the installation according to my invention are built in a manner similar to the one used in the commonly known apparatus for the electrolytic decomposition of water; the apparatus may be equipped with means for promoting the circulation of the electrolytic liquid, gas traps and the like, with heating means, cooling means and control means; it may also be equipped with conveying provisions, e. g. for the supply of water and the like.

The invention may also be used in connection with the well known electrolytic processes producing, besides gaseous, also liquid products or chiefly such liquid products as in the alkali-chloride electrolysis. In such a case, the provisions for the supply and removal of the electrolyte-liquid and for the separation of the liquid products of the process must be combined with the provisions according to my invention.

The process according to my invention may be carried out at normal, i. e. atmospheric, or at higher pressures, and it may be carried out at normal or elevated temperatures, or both.

Referring more particularly to the embodiment of my invention illustrated in Fig. 5, 1 is a diaphragm which may consist of asbestos board; 2 is a perforated hydrogen generating electrode made of iron; 3 is a perforated oxygen generating electrode made of nickel plated iron or nickel. The active matters which are chemically changeable or unstable are pressed in between the electrodes 2 and 3 and the diaphragm 1; between the hydrogen generating electrode 2 and the diaphragm 1 the active substance 4 is spread out and pressed, consisting of finely distributed iron or ironhydroxide with 10% HgO to improve the electric conductivity, whereas an active substance 5 is placed in between the oxygen generating electrode 3 and the diaphragm 1. This latter substance consists of nickelhydroxide mixed with graphite or finely divided nickel for increasing the electric conductivity. The electrolyte in the diaphragm and contacting with the electrodes consists of kalium lye. The electrodes and the active matter are surrounded by frames 6, while the frame 7 presses against the front of the electrodes. The iron closing plates 8 and 9 of the cells press against the frame 7. The cell closing plate 8, which forms the chamber for the hydrogen generating electrolyte, is connected on top to a conduit 10, which leads into the conduit 11, and at the bottom to a conduit 12 leading into the vertical conduit 13. The vertical conduits 11 and 13 lead into a container 14 for the separation of the hydrogen which, in turn is withdrawn through conduit 15. The chamber 14 for the separation of the hydrogen is filled to a large extent with an electrolyte, namely, kalium lye. Two horizontal conduits 16 and 17 terminate in the closing plate 9 of the chamber for the oxygen generating electrolyte which continue in the vertical tubes 18 and 19. The two vertical conduits 18 and 19 lead into the separation chamber 20 for the oxygen. The oxygen leaves this chamber through conduit 21. The oxygen chamber is also filled to a large extent with lye. The two closing plates 8 and 9 for the cells are pressed on to the frame by insulated screw members (not shown).

The positive current for the oxygen generating electrode is supplied through terminal flap 22, while the hydrogen generating electrode is connected by means of the terminal flap 23 with the source of electricity. This is more obvious from Fig. 6 of the drawing.

In discharged condition or state, the active substance between the hydrogen generating electrode and the diaphragm consists of ferrohydroxide, while the active substance between the oxygen generating electrode and the diaphragm consists of nickelhydroxydul.

When the electric current is switched on, the accumulator is charged until the voltage reaches about 1.45 volt. Under the influence of the current, the ferrohydroxide is reduced to iron, and the nickelhydroxydul is oxidized to nickelsuperoxyd. The gas generated during the charging period of the accumulator is collected in the containers 14 and 20. As soon as the accumulator is fully charged, the tension increases and the generation of gas begins at the oxygen and hydrogen generating electrodes proper. The apparatus now works as decomposer.

The generation of gas on the electrodes is stopped when the current is disconnected. The charged accumulator, which consists of the active substances, can be discharged by means of the electrodes adjacent to these substances.

In the drawing Fig. 5 only one pair of electrodes is shown. It is quite obvious that by suitable stationing of electrodes and wiring up of any number of such pairs of any size, any desired voltage and amperage can be absorbed by the decomposer, respectively liberated by the accumulator.

Instead of the arrangement shown on Fig. 5, whereby the active substances are disposed between the electrodes and diaphragms, one or both substances may be located on the outside of the electrode, and the electrodes be directly adjacent to the diaphragm.

While I believe the above described embodiments of my invention are preferred embodiments, I wish it to be understood that I do not desire to be limited to the exact details of process, design and construction shown and described, for obvious modifications will occur to a person skilled in the art.

What I claim is:

1. In a unitary apparatus for the electrolytic production of gases and for the accumulation of electric energy, a pair of metal electrodes of opposite polarity and electro-chemically unstable materials associated with said electrodes forming opposite electrodes of an accumulator cell and also serving to generate gases on passage of current through the cell, a diaphragm separating said electrodes, a casing surrounding said electrodes and said diaphragm, said diaphragm dividing said casing into two closed chambers for receiving an electrolyte, said casing being spaced from said electrodes to permit free circulation of the produced gases and electrolyte, means in each of said chambers to provide egress for gases generated in said chambers, and electrical connectors for said electrodes.

2. In a unitary apparatus for the electrolytic production of gases and for the accumulation of electric energy, a pair of metal electrodes of opposite polarity and electro-chemically unstable materials associated with said electrodes forming opposite electrodes of an accumulator cell and also serving to generate gases on passage of current through the cell, a diaphragm separating said electrodes, a casing surrounding said electrodes and said diaphragm, said diaphragm dividing said casing into two closed chambers for receiving an electrolyte, said casing being spaced from said electrodes to permit free circulation of the produced gases within the electrolyte, means associated with said casing to promote circulation of said electrolyte and to provide egress for gases generated in said chamber, and electrical connectors for said electrodes.

3. In a unitary apparatus for the electrolytic production of gases and for the accumulation of electric energy, a pair of substantially parallel metal electrodes of opposite polarity and a layer of electro-chemically unstable material supported by each of said electrodes forming opposite electrodes of an accumulator cell and also serving to generate gases on passage of current above the charging voltage of the accumulator through the cell, a diaphragm separating said electrodes, a casing spaced from said electrodes surrounding said electrodes and said diaphragm, said diaphragm dividing said casing into two closed chambers for receiving an electrolyte, an electrolyte holding and gas collecting receptacle for each of said chambers, a conduit connecting each of said receptacles with the bottom of its respective chamber for supplying an electrolyte thereto, a second conduit connecting each of said receptacles with the top of its respective chamber to permit a circulation of said electrolyte through said chambers and to provide egress for gases generated in said chambers, and electrical connectors for said electrodes.

4. In a unitary apparatus for the electrolytic production of gases and for the accumulation of electric energy, an asbestos diaphragm, a layer of iron hydroxide on one side of said diaphragm, a layer of nickel hydroxide on the other side of said diaphragm, a perforated iron electrode contacting said iron hydroxide layer and pressing the same against said diaphragm, a perforated nickel electrode contacting said nickel hydroxide layer and pressing the same against said diaphragm, frames surrounding said electrodes, a second set of frames engaging the front marginal edges of said electrodes, iron closing plates in tight engagement with said last mentioned frames and spaced from said electrodes to form a chamber between said electrodes and said plates, an electrolyte holding and gas collecting receptacle above said electrodes for each of said chambers, a conduit connecting each of said receptacles with the bottom of its respective chamber for supplying an electrolyte thereto, a second conduit connecting each of said receptacles with the top of its respective chamber to permit a circulation of said electrolyte and to provide egress for gases generated in said chambers, and electrical connectors for said electrodes.

HANS NIEDERREITHER.